United States Patent
Midha

(10) Patent No.: US 11,296,740 B2
(45) Date of Patent: Apr. 5, 2022

(54) AUTOMATIC GAIN CONTROL FOR A RECEIVER

(71) Applicant: STMicroelectronics International N.V., Geneva (CH)

(72) Inventor: Gagan Midha, Panipat (IN)

(73) Assignee: STMicroelectronics International N.V., Geneva (CH)

( * ) Notice: Subject to any disclaimer, the term of this patent is extended or adjusted under 35 U.S.C. 154(b) by 37 days.

(21) Appl. No.: 16/825,887

(22) Filed: Mar. 20, 2020

(65) Prior Publication Data
US 2020/0313708 A1 Oct. 1, 2020

Related U.S. Application Data

(60) Provisional application No. 62/824,114, filed on Mar. 26, 2019.

(51) Int. Cl.
*H04B 1/12* (2006.01)

(52) U.S. Cl.
CPC .................................. *H04B 1/123* (2013.01)

(58) Field of Classification Search
CPC ........ H04B 1/10; H04B 1/707; H04B 1/0085; H04B 1/30; H04B 1/123; H04B 1/7075; H04B 2201/7071; H04B 1/1027; H04B 1/109; H04B 1/7115; H04B 17/23; H04B 17/318; H04B 17/336; H04B 1/7117; H04B 10/2942; H04B 10/6931; H03F 2200/294;
(Continued)

(56) References Cited

U.S. PATENT DOCUMENTS

| 6,628,732 B1 * | 9/2003 | Takaki ................... H04W 52/24 375/345 |
| 6,843,597 B1 * | 1/2005 | Li ......................... H03G 3/3052 375/345 |

(Continued)

FOREIGN PATENT DOCUMENTS

| EP | 2239844 B1 * | 4/2013 | ........... H03G 3/3052 |
| WO | WO-0245257 A2 * | 6/2002 | ............. H03G 3/001 |

OTHER PUBLICATIONS

Savvopoulos et al., "Architecture and DSP Implementation of a DVB-S2 Baseband Demodulator," 12th Euromicro Conference on Digital System Design, Architectures, Methods and Tools, Aug. 27-29, 2009, Patras, Greece, 2009, 11 pages.

(Continued)

*Primary Examiner* — Lana N Le
(74) *Attorney, Agent, or Firm* — Seed IP Law Group LLP

(57) ABSTRACT

An automatic gain controller for a receiver analog frontend is provided. The automatic gain controller sets a plurality of gains for a plurality of analog frontend stages, respectively. The automatic gain controller detects a first signal level at an output of the analog frontend, determines that the first signal level is saturated and sets a first gain of a first analog frontend stage of the plurality of analog frontend stages to a first coarse gain value based on the first signal level. In response to setting the first gain, the automatic gain controller detects a second signal level at the output of the analog frontend, determines whether the second signal level is saturated and on a condition that the second signal level is not saturated, sets the first gain of the first analog frontend stage to a first fine gain value based on the second signal level.

23 Claims, 7 Drawing Sheets

(58) Field of Classification Search
CPC .......... H03F 2200/435; H03F 2200/78; H03F 3/195; H03F 2200/451; H03F 3/19; H04W 52/52; H03G 3/16; H03G 3/3052; H03G 3/3068; H03G 3/3078; H03G 3/22; H03G 3/26; H03G 3/00
See application file for complete search history.

(56) References Cited

U.S. PATENT DOCUMENTS

| | | | | |
|---|---|---|---|---|
| 7,187,915 | B2* | 3/2007 | Wang | H03G 3/3052 375/345 |
| 7,212,798 | B1* | 5/2007 | Adams | H03G 3/3068 330/278 |
| 7,515,929 | B2* | 4/2009 | Ramachandran | H04B 1/0067 455/550.1 |
| 7,630,686 | B2* | 12/2009 | Fukutani | H04L 27/22 455/63.1 |
| 9,222,962 | B2* | 12/2015 | Kondou | G01R 19/1659 |
| 10,523,251 | B1* | 12/2019 | Coban | H03G 3/3036 |
| 2003/0012313 | A1* | 1/2003 | Husted | H03G 5/165 375/345 |
| 2003/0181176 | A1* | 9/2003 | Darabi | H04B 1/406 455/182.3 |
| 2007/0135071 | A1* | 6/2007 | Lee | H04W 52/52 455/232.1 |
| 2012/0294398 | A1* | 11/2012 | Yucek | H03G 3/3052 375/345 |
| 2013/0336371 | A1* | 12/2013 | Chen | H03G 3/3068 375/219 |
| 2016/0380788 | A1* | 12/2016 | Waheed | H03D 3/008 375/319 |
| 2017/0005631 | A1* | 1/2017 | Akizuki | H03F 3/195 |
| 2019/0068153 | A1* | 2/2019 | Arslan | H04B 1/1027 |

OTHER PUBLICATIONS

Svitek et al., "DC Offsets in Direct-Conversion Receivers: Characterization and Implications," *IEEE Microwave Magazine* 6(3):76-86, 2005.

* cited by examiner

| Course Gain of baseband filter and variable gain amplifer | |
|---|---|
| Saturated Samples (%) | Gain (dB) |
| 90-100 | 0 |
| 50-89 | 12 |
| 25-49 | 18 |
| Less than 25 | 24 |

| Course Gain of mixer | |
|---|---|
| Saturated Samples (%) | Gain (dB) |
| 90-100 | 0 |
| 25-89 | 6 |
| Less than 25 | 12 |

| Course Gain of low-noise amplifier | |
|---|---|
| Saturated Samples (%) | Gain (dB) |
| 90-100 | 0 |
| Less than 90 | 6 |

AUTOMATIC GAIN CONTROL FOR A RECEIVER

BACKGROUND

Technical Field

This application is related to automatic gain control for a radio frequency (RF) receiver and, in particular, automatic gain control for a plurality of stages of an analog frontend of an RF receiver.

Description of the Related Art

Analog processing stages of a receiver frontend typically have variable gains. If the gains of the analog processing stages of the receiver frontend are not optimally set that leads to increasing the dynamic range of an analog-to-digital converter (ADC) used to digitize received signals. This in turn increases the complexity and cost of the analog frontend. Further, if the gains of the analog processing stages are not quickly set, parts of received data packets may not be optimally processed. It is challenging to optimally and expeditiously set the gains of the analog processing stages.

BRIEF SUMMARY

Provided herein are an automatic gain controller, a receiver and a method for expeditiously setting the gains of analog processing stages of a receiver frontend. Data packets received by the receiver or operated thereon by the automatic gain controller typically have a preamble preceding subsequent portions of the data packet. Due to the fact that the preamble is intended for synchronizing communication and does not include trafficked data like the subsequent portions of the data packet, the automatic gain controller may operate on the received preamble to set the gains of analog processing stages. The automatic gain controller may conclude the gain setting during the preamble of the data packet. The set gains are then used to amplify the subsequent portions of the data packet. Gain setting may be repeated each data packet.

Because the preamble is typically relatively short, it is advantageous for the automatic gain controller to quickly set the gains of analog processing stages. The automatic gain controller sets the gains of the analog processing stages in two phases. In a first phase a coarse gain is set and in a second phase a fine gain is set. The coarse gain may be set conservatively. The fine gain then increases the conservatively-set coarse gain to reach an optimum gain.

Initially, the gain of the analog processing stages is set to a maximum level. Then, the first phase of gain setting commences. In the first phase, the automatic gain controller successively sets the coarse gain for the analog processing stages until an output signal of the analog frontend is determined not to be saturated. The automatic gain controller sets the coarse gain conservatively such that the output signal representative of the preamble falls below a saturation level.

In response to the output signal being non-saturated, the second phase commences. In the second phase, the automatic gain controller uses a flash comparator to determine a fine gain for an analog frontend stage. The automatic gain controller increases the gain of the analog frontend stage by the fine gain.

Optimally setting the gains of the analog processing stages of the receiver frontend allows for decreasing the dynamic range of an analog-to-digital converter (ADC) used to digitize received signals. This in turn reduces the cost of the analog frontend. It is advantageous to complete setting the gains of the analog processing stages quickly in order to meet temporal constraints. It is advantageous to complete setting the gains during the preamble period of a packet, which may have a duration of eight microseconds (μs), to ensure that the gain are set in time for receiving subsequent portions of a data packet.

DETAILED DESCRIPTION

Figure 1:
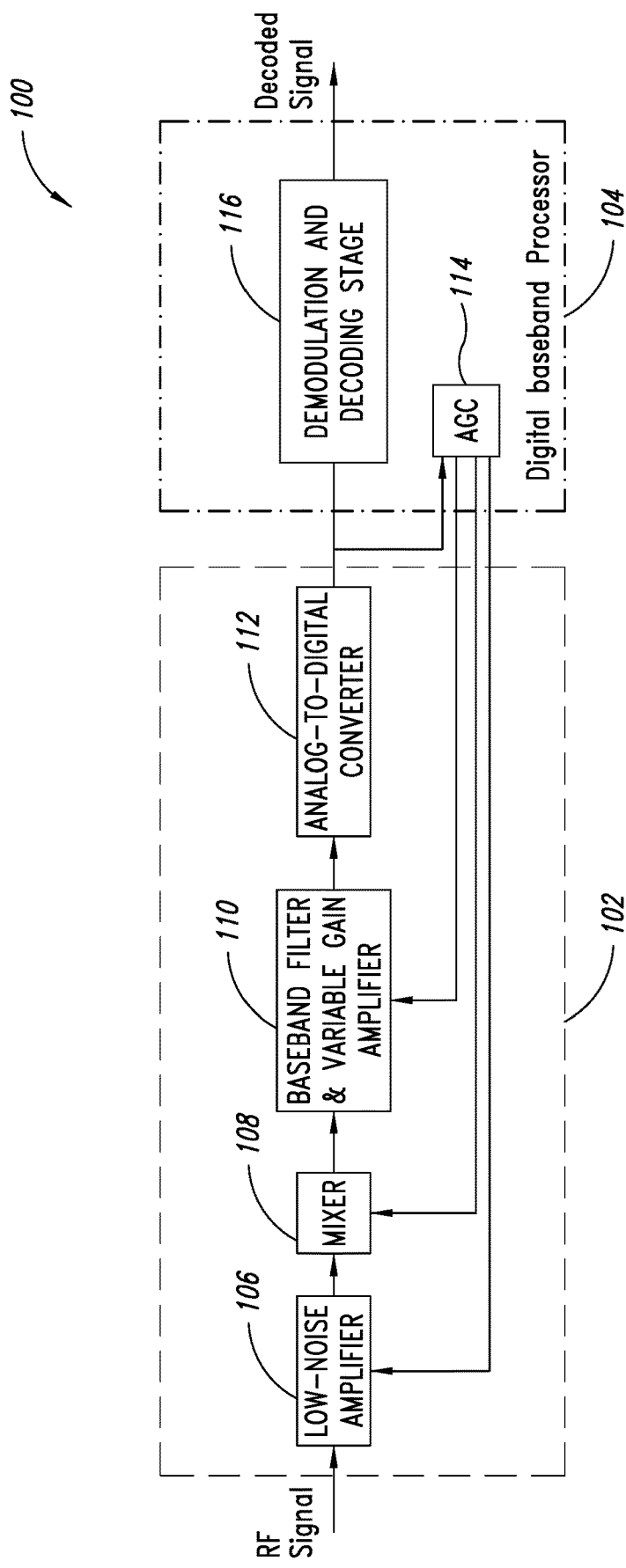
FIG. 1 shows a block diagram of a radio frequency (RF) receiver.

FIG. 1 shows a block diagram of a radio frequency (RF) receiver 100. The receiver 100 includes an analog frontend 102 and a digital baseband processor 104. The analog frontend 102 includes a plurality of analog frontend stages. The plurality of analog frontend stages include a low-noise amplifier 106, a mixer 108, a baseband filter and variable gain amplifier 110 and an analog-to-digital converter 112. The digital baseband processor 104 includes an automatic gain controller 114 and a demodulation and decoding stage 116. The low-noise amplifier 106, mixer 108 and baseband filter and variable gain amplifier 110 each have a data input, a control input and a data output. The analog-to-digital converter 112 has a data input and a data output. The automatic gain controller 114 has a data input and first, second and third control outputs. The demodulation and decoding stage 116 has a data input and a data output.

The low-noise amplifier 106 may be any type of amplifier of a receiver frontend. The low-noise amplifier 106 may be any type of amplifier that receives an RF signal and amplifies a voltage level of the RF signal. The low-noise amplifier 106 receives, at its data input, the RF signal and outputs, at its data output, an amplified signal.

The mixer 108 may be any type of device that translates an RF signal into a lower frequency signal for further processing. The translation may be performed by multiplication or a nonlinear operation. The mixer 108 receives, over the data input, the amplified signal and outputs over, the data output, a translated signal.

The baseband filter and variable gain amplifier 110 may be any type of device that low-pass filters a signal to suppress unwanted or out-of-band signals or noise and amplifies or attenuates the signal. The baseband filter and variable gain amplifier 110 may apply an adjustable gain to the signal. The baseband filter and variable gain amplifier 110 receives, over it data input, the translated signal and outputs, over its data output, a filtered signal.

The analog-to-digital converter 112 may be any type of device configured to convert an analog signal to a digital signal. The analog-to-digital converter 112 receives, at its data input, the filtered signal and outputs, at its data output, a digital signal.

The demodulation and decoding stage 116 may be any type of processing stage configured to receive the digital signal and filter, demodulate or decode the digital signal to produce a decoded signal. The demodulation and decoding stage 116 may receive, at its data input, the digital signal and may output, at its data output, the decoded signal.

The demodulation and decoding stage 116 includes a filter 117, a demodulator 119 and a decoder 121. The filter 117 has an input coupled to the output of the analog-to-digital converter 112 and an output coupled to an input of the demodulator 119. The filter 117 may be a narrowband filter, bandpass filter or a notch filter. The demodulator 119 has an output coupled to an input of the decoder 121 and an output coupled to the output of the demodulation and decoding stage 116.

The low-noise amplifier 106, mixer 108, baseband filter and variable gain amplifier 110 each have a variable gain set by the automatic gain controller 114. The low-noise amplifier 106, mixer 108, baseband filter and variable gain amplifier 110 each have a control input for receiving respective signals representative of the gain from the automatic gain controller 114.

The automatic gain controller 114 may be any type of device, such as a programmable circuit, configured to control or set the gains of the low-noise amplifier 106, mixer 108, baseband filter and variable gain amplifier 110. The automatic gain controller 114 has a data input coupled to the data output of the analog-to-digital converter 112. The automatic gain controller 114 receives the signal output by the analog-to-digital converter 112. The automatic gain controller 114 has a plurality of control outputs. Each control output of the plurality of control outputs is coupled to a respective control input of the low-noise amplifier 106, mixer 108, baseband filter and variable gain amplifier 110. As described herein, the automatic gain controller 114 determines a plurality of gains respectively associated with the low-noise amplifier 106, mixer 108, baseband filter and variable gain amplifier 110. The automatic gain controller 114 outputs the plurality of gains over the plurality of control outputs, respectively, to the low-noise amplifier 106, mixer 108, baseband filter and variable gain amplifier 110.

Figure 2:
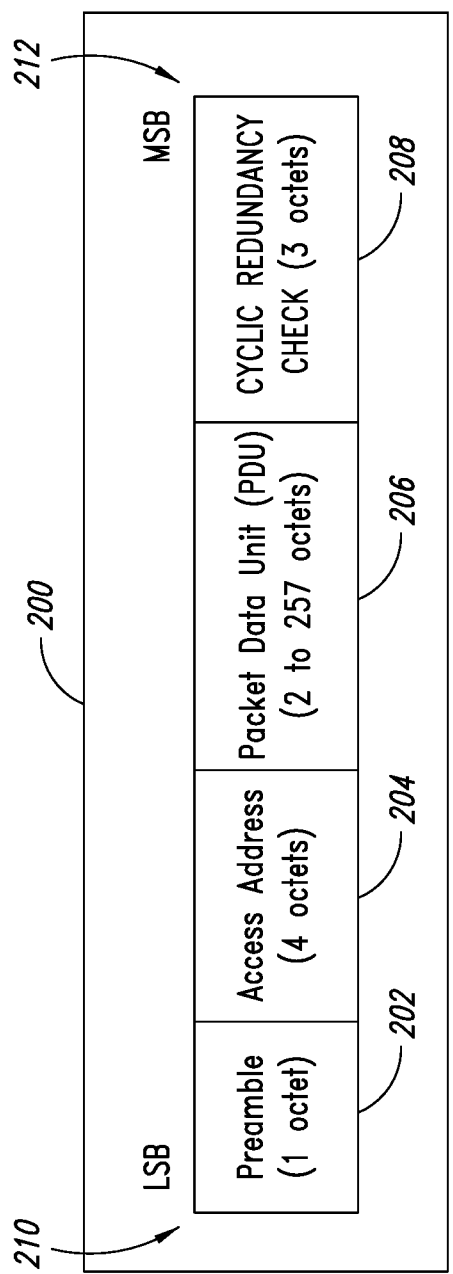
FIG. 2 shows an example of a format of a data packet.

FIG. 2 shows an example of a format of a data packet 200. The data packet 200 includes a preamble 202, an access address 204, a packet data unit (PDU) 206 and a cyclic redundancy check (CRC) 208 that sequentially lie between a least significant bit (LSB) 210 (or first bit of the data packet 200) and a most significant bit (MSB) 212 (or last bit of the data packet 200). As shown in FIG. 2, the preamble 202 may include one octet (or eight bits), the access address 204 may include four octets (or 32 bits), the PDU 206 may include between two and 257 octets and the CRC 208 may include three octets.

The automatic gain controller 114 sets the gains of the analog frontend 102 based on the preamble 202. It is desirable for the automatic gain controller 114 to complete setting the gains of the analog frontend 102 stages (low-noise amplifier 106, mixer 108 and baseband filter and variable gain amplifier 110 thereof) during a preamble time for processing the preamble 202. That is, it is desirable for the automatic gain controller 114 to complete setting the gain prior to receiving the access address 204 of the data packet 200. The preamble 202 may be used to synchronize communication between the transmitter and the receiver 100. Accordingly, the automatic gain controller 114 may use the preamble 202 and the transmission time thereof to optimize the gains of the low-noise amplifier 106, mixer 108 and baseband filter and variable gain amplifier 110. The automatic gain controller 114 may conclude setting the gains during the duration of the preamble 202 such that optimum gains are set in time for receiving the access address 204 and subsequent portions of the data packet 200.

The duration of the preamble 202 may vary depending on utilized communication frequencies. In some systems, each data bit may be communicated in one microsecond (μs) thereby making the duration of an eight-bit preamble 202 eight μs.

Figure 3:
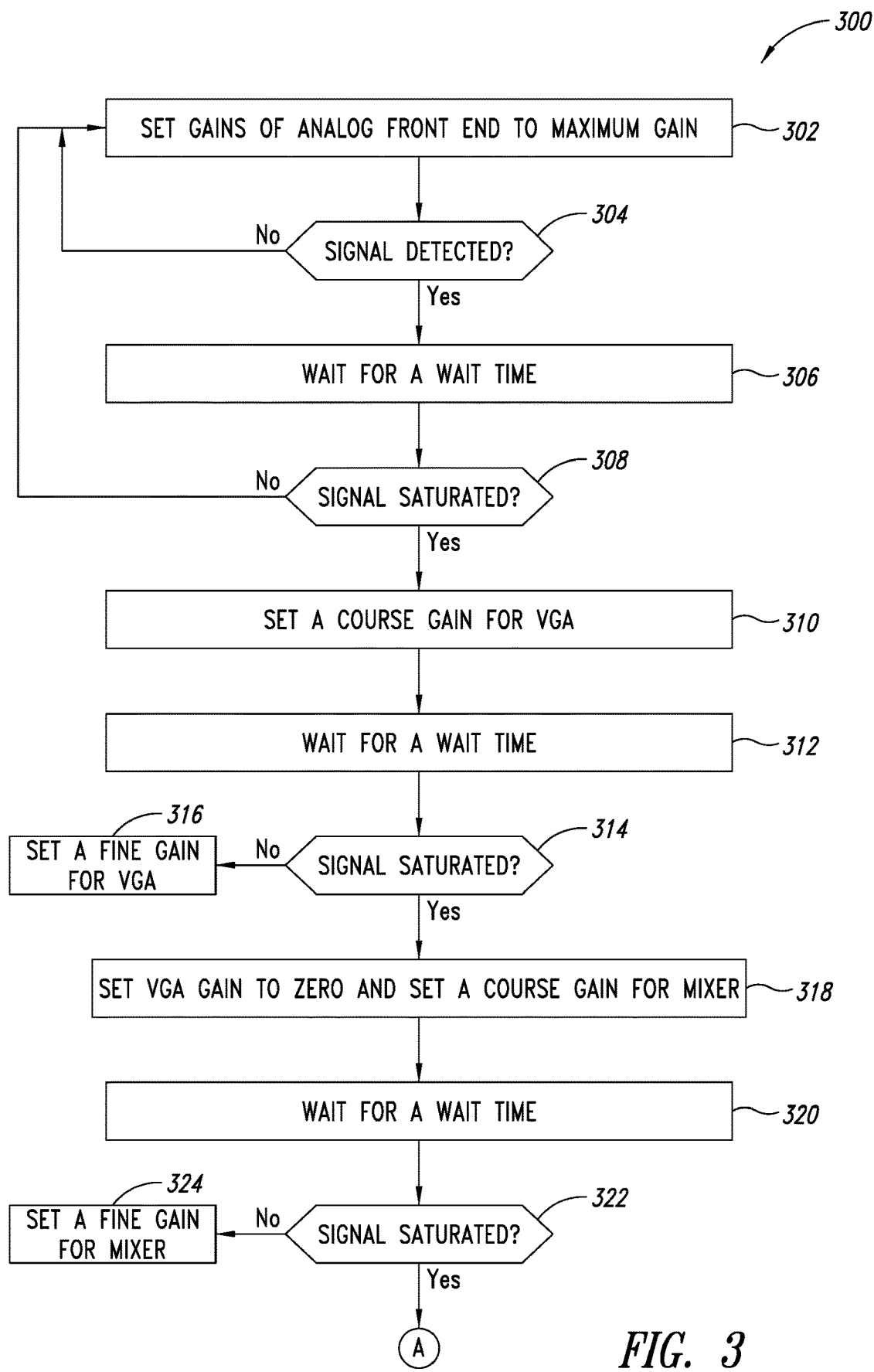
FIG. 3 shows a flow diagram of a method for performing automatic gain control.
Figure 3:
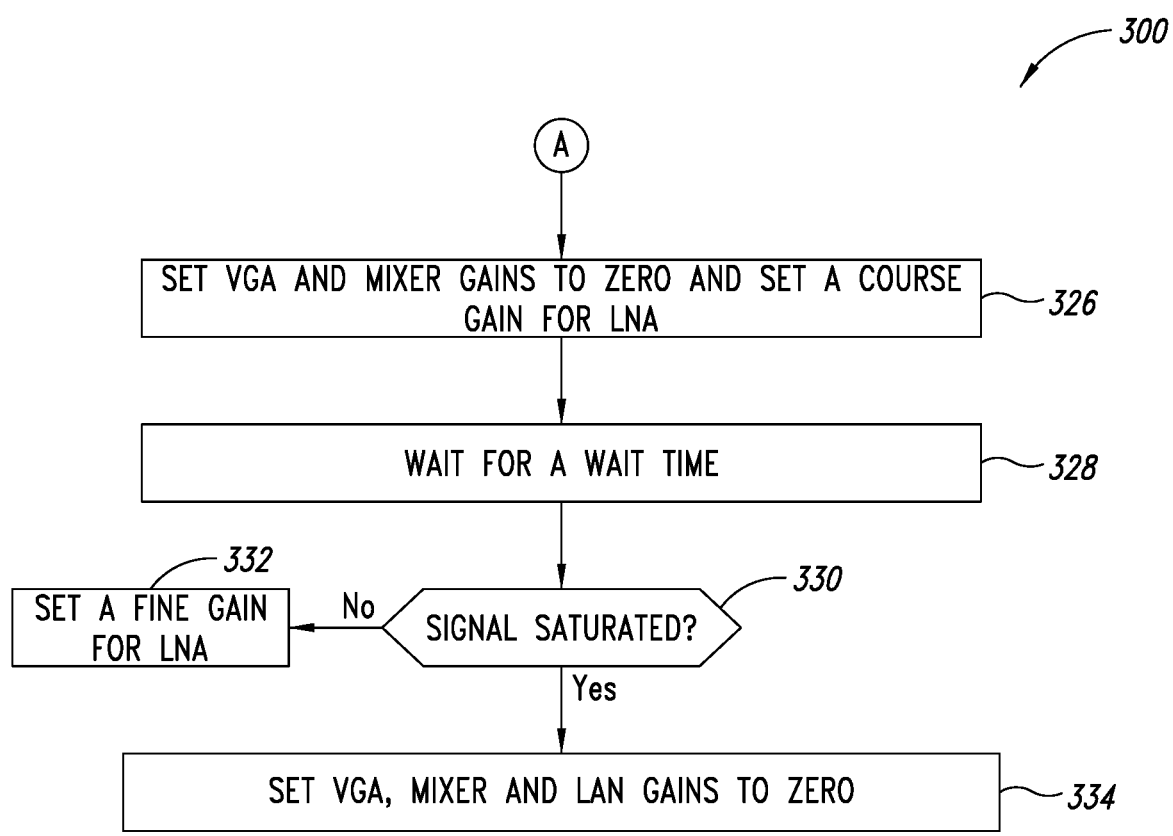

FIG. 3 shows a flow diagram of a method 300 for performing automatic gain control. In the method 300, the automatic gain controller 114 sets the gains of the analog frontend 102 to a maximum gain at 302. The automatic gain controller 114 may set the gains of the low-noise amplifier 106, mixer 108 and baseband filter and variable gain amplifier 110 to their respective maximum gains. For example, the low-noise amplifier 106 may have a maximum gain of 12 decibels (dB), the mixer 108 may have a maximum gain of 24 dB and baseband filter and variable gain amplifier 110 may have a maximum gain of 36 dB. After setting the respective gains, the automatic gain controller 114 outputs the respective gains of the low-noise amplifier 106, mixer 108 and baseband filter and variable gain amplifier 110 over the first, second and third control outputs.

The automatic gain controller 114, at 304, determines whether a signal is detected. The automatic gain controller 114 may determine whether the signal is detected at the output of the analog-to-digital converter 112. Determining whether the signal is detected may include determining whether the signal (for example, an amplitude or a power of the signal) exceeds a signal detection threshold. If the automatic gain controller 114 determines that the signal is not detected, the method 300 reverts to setting the gains of the analog frontend 102 to the maximum gain at 302.

Conversely, if the signal is detected, the automatic gain controller 114 waits for a wait time at 306. The wait time may be 2 μs or any other wait time. Implementing the wait time is advantageous in that it allows the signal (or amplitude or power thereof) to converge or settle following setting the gains of the stages of the analog frontend 102. After the gains are set, it may take time for the stages of the analog frontend 102 to react to the gains and process the received signal in accordance with the set gains. The wait times described herein at 306, 312, 320 and 328 may predominantly consume gain setting time. In the method 300, a maximum of four wait times are implemented prior to setting a fine gain at 332 or setting all gains to zero at 334. A minimum of one wait time is implemented prior to reverting to step 302. Thus, the processing time of the method is between 2 μs and 8 μs.

The automatic gain controller 114 determines, at 308, whether the signal at the output of the analog-to-digital converter 112 is saturated. Determining whether the signal is saturated may include taking multiple samples of the signal, whereby each sample may be taken over a half cycle of the signal. The number of samples may be four samples. However, a multiple of four samples or any other number of samples may be taken. For example, given that each sample is taken over a half cycle, four samples may be taken over two cycles of the signal. In sampling, a maximum value of the signal may be determined over a duration of half a clock cycle. The automatic gain controller 114 then determines whether each sample is saturated given the resolution of the analog-to-digital converter 112. For example, a sample may be determined to be saturated if the sample reaches a maximum resolution of the analog-to-digital converter 112. Generally, the sample may be determined to be saturated if the sample exceeds a saturation threshold.

If none of the samples are saturated, the method 300 reverts to setting the gains of the analog frontend to the maximum gain at 302. Conversely, if at least one of the samples is saturated, the method 300 proceeds to setting a course gain for the baseband filter and variable gain amplifier 110 at 310. The baseband filter and variable gain amplifier 110 is the last stage in the frontend 102 chain prior to the analog-to-digital converter 112. Gain setting is performed in reverse order in the analog frontend 102 chain from the baseband filter and variable gain amplifier 110 to the low-noise amplifier 106.

After setting the coarse gain of the baseband filter and variable gain amplifier 110, the automatic gain controller 114 waits for a wait time at 312. The wait time may have the same or different duration as the wait time at 306. Then, the automatic gain controller 114 performs a saturation check at 314. The saturation check at 314 is similar to the saturation check performed at 308. If the signal is determined to have no saturated samples, the automatic gain controller 114 sets a fine gain for the baseband filter and variable gain amplifier 110 at 316 as described herein.

Conversely, if the signal is determined to have at least one saturated sample, the automatic gain controller 114, at 318, sets the gain of the baseband filter and variable gain amplifier 110 to zero and sets a course gain for the mixer 108. The automatic gain controller 114 allows a wait time to elapse at 320, whereby the wait time may be the same or different than the wait times of steps 306 and 312. The way time is advantageous in that it allows for the signal to react to the implemented gain changes.

At 322, the automatic gain controller 114 performs another saturation check. The saturation check may be the same as the saturation check performed at 308. If the saturation check yields a determination that no samples of the signal are saturated, the automatic gain controller 114 sets a fine gain for the mixer at 324. Conversely, if the saturation check yields a determination that a sample of the signal is saturated, the automatic gain controller 114 sets, at 326, the gains of the baseband filter and variable gain amplifier 110 and mixer 108 to zero and sets a course gain for the low-noise amplifier 106.

The automatic gain controller 114 allows a wait time to elapse at 328. The automatic gain controller 114 determines, at 330, whether the signal is saturated. If the automatic gain controller 114 determines that the signal is not saturated, the automatic gain controller 114 sets a fine gain for the low-noise amplifier 106 at 332. Conversely, if the automatic gain controller 114 determines that the signal is saturated, the automatic gain controller 114 sets the baseband filter and variable gain amplifier 110, mixer 108 and low-noise amplifier 106 gains to zero at 334.

Figures 4, 5:
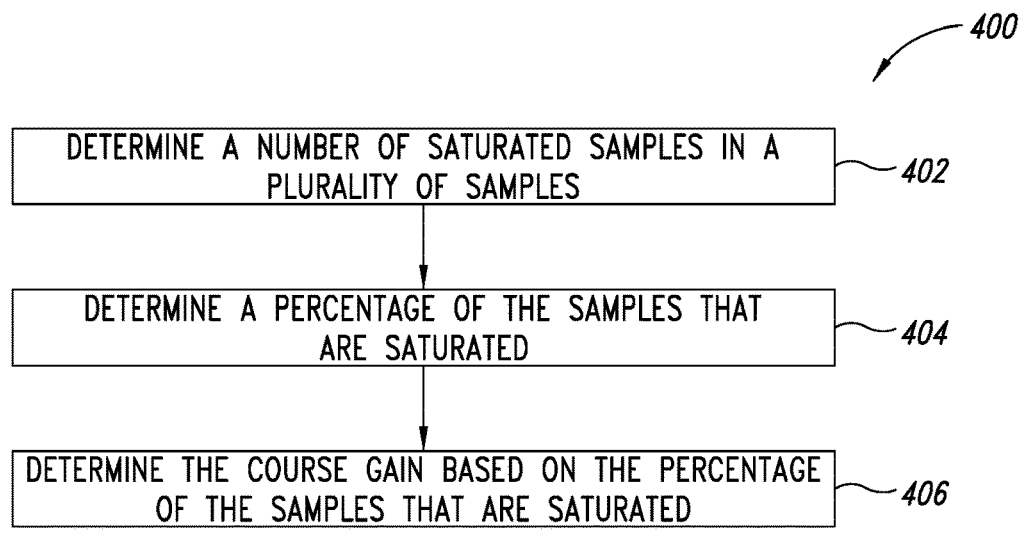
FIG. 4 shows a flow diagram of a method for determining the coarse gain of a frontend stage.
FIG. 5 shows an example of lookup tables for determining coarse gain of frontend stages based on the percentage of the saturated samples.

FIG. 4 shows a flow diagram of a method 400 for determining the coarse gain of a frontend 102 stage. The method 400 may be performed in any one of steps 310, 318 or 326 for setting the coarse gain of the baseband filter and variable gain amplifier 110, mixer 108 or low-noise amplifier 106, respectively. At 402, the automatic gain controller 114 determines a number of saturated samples in a plurality of samples. As described herein, the number of the plurality of samples may be four or a multiple of four and each sample may be obtained over half a cycle of the signal output by the analog-to-digital converter 112. The automatic gain controller 114 determines a percentage of the samples that are saturated at 404. For example, the percentage may be determined as a ratio of the number of samples that are saturated to the total number of samples. The automatic gain controller 114 determines the coarse gain based on the percentage of the samples that are saturated at 406. For example, the automatic gain controller 114 may consult or query a lookup table to determine the gain from the percentage of the samples that are saturated.

FIG. 5 shows an example of lookup tables for determining coarse gains of the stages of the frontend 102 based on the percentage of the saturated samples. After determining the percentage of the saturated samples, the automatic gain controller 114 may use the percentage of the saturated samples to determine the coarse gain of the baseband filter and variable gain amplifier 110, mixer 108 or low-noise amplifier 106 based on the lookup table.

The lookup tables present criteria for determining the coarse gains of the stages of the frontend 102. The criteria include rules for setting the coarse gains of the stages of the frontend 102. Coarse gain is inversely proportional to the percentage of the saturated samples, whereby a higher percentage of saturated samples triggers the automatic gain controller 114 to set a lower coarse gain and vice-versa. It is noted that the coarse gains and their associated ranges of the percentage of saturated samples shown in FIG. 5 are exemplary and in various embodiments different values for the coarse gains and percentage of saturated samples may be used. In addition, the relationship between the coarse gain and the percentage of saturated samples may alternatively be established using other techniques, such as equations associating the coarse gain with the percentage of saturated samples or discrete values for the coarse gain relative to ranges or discrete values for the percentage of saturated samples.

Figure 6:
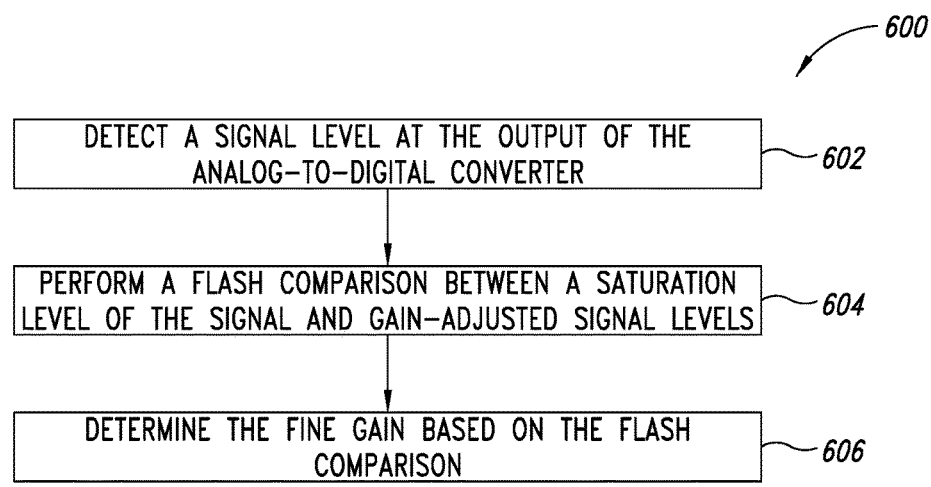
FIG. 6 shows a flow diagram of a method for determining the fine gain of a frontend stage.

FIG. 6 shows a flow diagram of a method 600 for determining the fine gain of a frontend 102 stage. The method 600 may be performed as part of any one of steps 316, 324 or 332 for setting the fine gain for the coarse gain of the baseband filter and variable gain amplifier 110, mixer 108 or low-noise amplifier 106, respectively. In the method, the automatic gain controller 114 at 602 detects a signal level at the output of the analog-to-digital converter 112. The automatic gain controller 114 may detect the signal level when determining whether the signal is saturated at steps 314, 322 or 330.

The signal level may be a maximum amplitude or power of any sample of the signal. Further, the signal level may be an average, a root mean square (RMS) or any other function of the amplitude or power of the samples of the signal. The automatic gain controller 114, at 604, performs a flash comparison between a saturation level of the signal and gain-adjusted signal levels. The flash comparison, which is described in further detail herein, adjusts the signal level according to incremental gains and compares adjusted signal levels with the saturation level of the signal. After performing the flash comparison, the automatic gain controller 114, at 606, determines the fine gain for the baseband filter and variable gain amplifier 110, mixer 108 or low-noise amplifier 106 based on the flash comparison.

Figure 7:
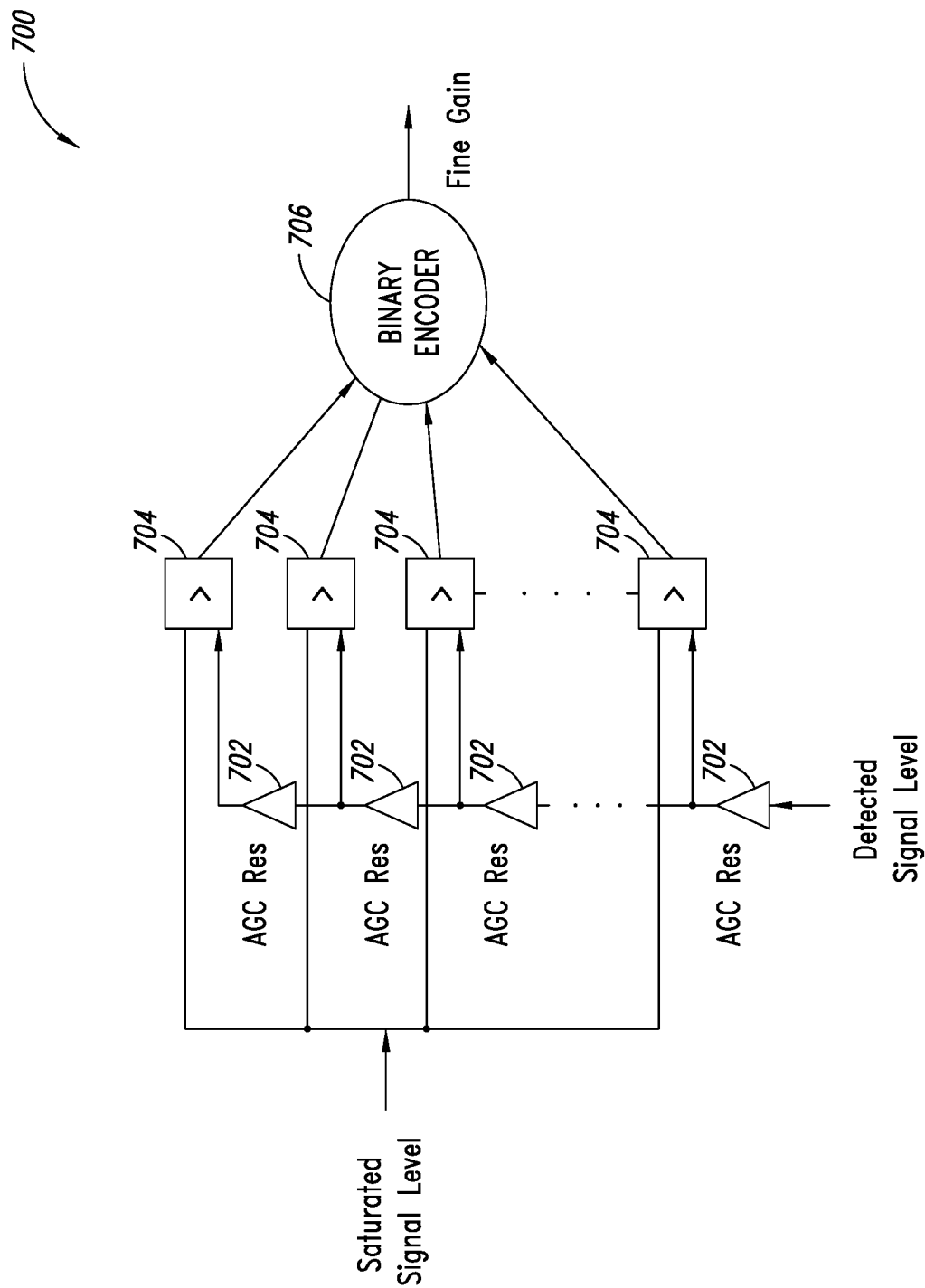
FIG. 7 shows a flash comparator for determining the fine gain of a frontend stage.

FIG. 7 shows a flash comparator 700 for determining the fine gain of a stage of the frontend 102. The flash comparator 700 may be part of the automatic gain controller 114. The flash comparator 700 may provide information usable for determining the fine gain described with reference to FIG. 6. The flash comparator 700 includes a plurality of amplifiers 702, a plurality of comparators 704 and a binary encoder 706. The number of the plurality of amplifiers 702 and plurality of comparators 704 may be the same. The resolution of the fine gain is proportional to the number of the plurality of amplifiers 702 and plurality of comparators 704.

The flash comparator 700 receives a saturated signal level, a detected signal level and a fine gain resolution. The flash comparator 700 operates on the saturated signal level, detected signal level and fine gain resolution (denoted 'AGC Res') and outputs a fine gain for the baseband filter and variable gain amplifier 110, mixer 108 or low-noise amplifier 106. The saturated signal level may be a signal level representative of the maximum resolution of the analog-to-digital converter 112 and at which the signal output by the analog-to-digital converter 112 is saturated. The fine gain resolution may be a desired resolution of the fine gain. For example, the fine gain resolution may be one dB, two dB, among other resolutions. The fine gain resolution may be smaller than the coarse gain resolution described with reference to FIG. 5. For a coarse gain resolution of 6 dB, the fine gain resolution may be any integer divisor of the coarse gain, such as 3 dB, 2 dB, 1 dB or 0.5 dB, among other values. Therefore, the fine gain may be established within the coarse gain resolution.

For example, if at 310 the coarse gain of the baseband filter and variable gain amplifier 110 is set to 12 dB and the fine gain resolution is 1 dB, after fine gain setting, the gain of the baseband filter and variable gain amplifier 110 may be set to 12 dB, 13 dB, 14 dB, 15 dB, 16 dB or 17 dB. Similarly, if the fine gain resolution is 2 dB, after fine gain setting, the gain of the baseband filter and variable gain amplifier 110 may be set to 12 dB, 14 dB or 16 dB. While coarse gain setting is performed conservatively to establish a lower gain than optimum, fine gain setting serves to increase the coarse gain to a more optimum level.

Each comparator 704 of the plurality of comparators 704 receives the saturated signal level. In addition, each comparator 704 also receives the detected signal level having a gain that is amplified by a multiple of the fine gain resolution. For example, in the event that the fine gain resolution is 1 dB and the coarse gain resolution is 6 dB, a first comparator 704 receives the detected signal level having a gain amplified by 1 dB, a second comparator 704 receives the detected signal level having a gain amplified by 2 dB, a third comparator 704 receives the detected signal level having a gain amplified by 3 dB, a fourth comparator 704 receives the detected signal level having a gain amplified by 4 dB and a fifth comparator 704 receives the detected signal level having a gain amplified by 5 dB. The plurality of comparators 704 each compare the saturated signal level with the detected signal level having the amplified gain. Each comparator 704 outputs a signal having a logical state that indicates whether the detected signal level having the amplified gain exceeds the saturated signal level. For example, the output may be a logical one when the level of the detected signal having the amplified gain exceeds the saturated signal level and a logical zero when the level of the detected signal having the amplified gain does not exceed the saturated signal level. Alternatively, the binary convention may be reversed.

The binary encoder 706 receives the outputs of the plurality of comparators 706. The binary encoder 706 identifies a largest gain at which the signal having the amplified gain does not exceed the saturated signal level. The automatic gain controller 114 set the fine gain to the identified largest gain. Continuing with the example above, the transition from a logical zero output to a logical one of the plurality of comparators 704 represents a transition of where the level of the gain-adjusted detected signal rises from a level below the saturated signal level to above the saturated signal level. To determine the fine gain, the comparator 704 that outputs a logical zero is identified. Then, the fine gain is set to be equal to the gain of the amplifier 702 at the input of the identified comparator 704.

The coarse gain may be adjusted by the fine gain to set the gain of a stage of the frontend 102. For example, the fine gain may be added to the coarse gain to yield the gain of the stage of the frontend 102. For example, if the coarse gain of the mixer is determined as 6 dB and the fine gain is determined to be 3 dB, the automatic gain controller 114 may set the mixer 108 gain to 9 dB.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A receiver, comprising:
   an analog frontend including a plurality of analog frontend stages having respective gains; and
   an automatic gain controller configured to:
      detect a first signal level at an output of the analog frontend;
      determine that the first signal level is saturated;
      set a first gain of a first analog frontend stage of the plurality of analog frontend stages to a first coarse gain value based on the first signal level in response to determining that the first signal level is saturated;
      in response to setting the first gain, detect a second signal level at the output of the analog frontend;
      determine whether the second signal level is saturated; and
      in response to determining that the second signal level is not saturated, set the first gain of the first analog frontend stage to a first fine gain value based on the second signal level, wherein the automatic gain controller is configured to set the first gain of the first analog frontend stage to the first fine gain value by:
         generating a plurality of gain-adjusted signal levels by applying a respective plurality of fine gain values to the second signal level;
         comparing, in a comparator, the plurality of gain-adjusted signal levels to a saturation level; and
         determining the first fine gain value based on comparing, in the comparator, the plurality of gain-adjusted signal levels to the saturation level.

2. The receiver of claim 1, wherein the automatic gain controller is configured to:
   on a condition that the second signal level is saturated,
      set the first gain of the first analog frontend stage to zero; and
      set a second gain of a second analog frontend stage of the plurality of analog frontend stages to a second coarse gain value based on the second signal level.

3. The receiver of claim 2, wherein the automatic gain controller configured to:
   after setting the second gain of the second analog frontend stage to the second coarse gain value, detect a third signal level at the output of the analog frontend;

determine whether the third signal level is saturated;
on a condition that the third signal level is saturated,
    set the second gain of the second analog frontend stage to zero; and
    set a third gain of a third analog frontend stage of the plurality of analog frontend stages to a third coarse gain value based on the third signal level; and
on a condition that the third signal level is not saturated,
    set the second gain of the second analog frontend stage of the plurality of analog frontend stages to a second fine gain value;
detect a fourth signal level at the output of the analog frontend;
determine whether the fourth signal level is saturated;
on a condition that the fourth signal level is saturated, set the third gain of the third analog frontend stage to zero; and
on a condition that the third signal level is not saturated, set the third gain of the third analog frontend stage of the plurality of analog frontend stages to a third fine gain value.

4. The receiver of claim 1, wherein the automatic gain controller is configured to:
detect the first signal level at the output of the analog frontend by:
    obtaining a plurality of samples of a first signal at the output of the analog frontend; and
    identifying a plurality of signal levels associated with the plurality of samples, respectively; and
determine that the first signal level is saturated by:
    determining that at least one signal level of the plurality of signal levels exceeds a saturation threshold; and
    in response to determining that the at least one signal level of the plurality of signal levels exceeds the saturation threshold, determining that the first signal level is saturated.

5. The receiver of claim 1, wherein the automatic gain controller is configured to set the first gain of the first analog frontend stage to the first coarse gain by:
determining a number of a plurality of signal levels that exceed a saturation threshold or a percentage of the plurality of signal levels that exceed the saturation threshold; and
setting the first gain based on the number of the plurality of signal levels that exceed the saturation threshold or the percentage of the plurality of signal levels that exceed the saturation threshold.

6. The receiver of claim 5, wherein the first coarse gain value is negatively correlated with the number of the plurality of signal levels that exceed the saturation threshold or the percentage of the plurality of signal levels that exceed the saturation threshold.

7. The receiver of claim 1, wherein the automatic gain controller is configured to:
detect the second signal level at the output of the analog frontend by:
    obtaining a plurality of samples of a second signal at the output of the analog frontend;
    identifying a plurality of signal levels associated with the plurality of samples, respectively; and
    determining the second signal level based on the plurality of signal levels associated with the plurality of samples, respectively; and
determine whether the second signal level is saturated by determining whether the second signal level exceeds a saturation threshold.

8. The receiver of claim 7, wherein the automatic gain controller is configured to determine the second signal level as a maximum, average or root mean square of the plurality of signal levels.

9. A method, comprising:
detecting a first signal level at an output of an analog frontend;
determining that the first signal level is saturated;
setting a first gain of a first analog frontend stage of a plurality of analog frontend stages to a first coarse gain value based on the first signal level in response to determining that the first signal level is saturated;
in response to setting the first gain, detecting a second signal level at the output of the analog frontend;
determining whether the second signal level is saturated; and
in response to determining that the second signal level is not saturated, setting the first gain of the first analog frontend stage to a first fine gain value based on the second signal level, wherein setting the first gain of the first analog frontend stage to the first fine gain value includes:
    generating a plurality of gain-adjusted signal levels by applying a respective plurality of fine gain values to the second signal level;
    comparing, in a comparator, the plurality of gain-adjusted signal levels to a saturation level; and
    determining the first fine gain value based on comparing, in the comparator, the plurality of gain-adjusted signal levels to the saturation level.

10. The method of claim 9, comprising:
on a condition that the second signal level is saturated,
    setting the first gain of the first analog frontend stage to zero; and
    setting a second gain of a second analog frontend stage of the plurality of analog frontend stages to a second coarse gain value based on the second signal level.

11. The method of claim 10, comprising:
after setting the second gain of the second analog frontend stage to the second coarse gain value, detecting a third signal level at the output of the analog frontend;
determining whether the third signal level is saturated;
on a condition that the third signal level is saturated,
    setting the second gain of the second analog frontend stage to zero; and
    setting a third gain of a third analog frontend stage of the plurality of analog frontend stages to a third coarse gain value based on the third signal level; and
on a condition that the third signal level is not saturated,
    setting the second gain of the second analog frontend stage of the plurality of analog frontend stages to a second fine gain value;
detecting a fourth signal level at the output of the analog frontend;
determining whether the fourth signal level is saturated;
on a condition that the fourth signal level is saturated,
    setting the third gain of the third analog frontend stage to zero; and
on a condition that the third signal level is not saturated,
    setting the third gain of the third analog frontend stage of the plurality of analog frontend stages to a third fine gain value.

12. The method of claim 9, comprising:
detecting the first signal level at the output of the analog frontend by:
    obtaining a plurality of samples of a first signal at the output of the analog frontend; and identifying a plurality of signal levels associated with the plurality of samples, respectively; and
determining that the first signal level is saturated by:
determining that at least one signal level of the plurality of signal levels exceeds a saturation threshold; and
in response to determining that the at least one signal level of the plurality of signal levels exceeds the saturation threshold, determining that the first signal level is saturated.

13. The method of claim 9, wherein setting the first gain of the first analog frontend stage to the first coarse gain value includes:
determining a number of a plurality of signal levels that exceed a saturation threshold or a percentage of the plurality of signal levels that exceed the saturation threshold; and
setting the first gain based on the number of the plurality of signal levels that exceed the saturation threshold or the percentage of the plurality of signal levels that exceed the saturation threshold.

14. The method of claim 13, wherein the first coarse gain value is negatively correlated with the number of the plurality of signal levels that exceed the saturation threshold or the percentage of the plurality of signal levels that exceed the saturation threshold.

15. The method of claim 9, comprising:
detecting the second signal level at the output of the analog frontend by:
obtaining a plurality of samples of a second signal at the output of the analog frontend;
identifying a plurality of signal levels associated with the plurality of samples, respectively; and
determining the second signal level based on the plurality of signal levels associated with the plurality of samples, respectively; and
determining whether the second signal level is saturated by determining whether the second signal level exceeds a saturation threshold.

16. The method of claim 15, comprising:
determining the second signal level as a maximum, average or root mean square of the plurality of signal levels.

17. A system, comprising:
an analog frontend including a plurality of analog frontend stages having respective gains; and
a baseband processor including:
a demodulation and decoding stage; and
an automatic gain controller configured to:
detect a first signal level at an output of the analog frontend;
determine that the first signal level is saturated;
set a first gain of a first analog frontend stage of the plurality of analog frontend stages to a first coarse gain value based on the first signal level in response to determining that the first signal level is saturated;
in response to setting the first gain, detect a second signal level at the output of the analog frontend;
determine whether the second signal level is saturated; and
in response to determining that the second signal level is not saturated, set the first gain of the first analog frontend stage to a first fine gain value based on the second signal level, wherein the automatic gain controller is configured to set the first gain of the first analog frontend stage to the first fine gain value by:
generating a plurality of gain-adjusted signal levels by applying a respective plurality of fine gain values to the second signal level;
comparing, in a comparator, the plurality of gain-adjusted signal levels to a saturation level; and
determining the first fine gain value based on comparing, in the comparator, the plurality of gain-adjusted signal levels to the saturation level.

18. The system of claim 17, wherein the automatic gain controller is configured to:
on a condition that the second signal level is saturated, set the first gain of the first analog frontend stage to zero; and
set a second gain of a second analog frontend stage of the plurality of analog frontend stages to a second coarse gain value based on the second signal level.

19. The system of claim 18, wherein the automatic gain controller is configured to:
after setting the second gain of the second analog frontend stage to the second coarse gain value, detect a third signal level at the output of the analog frontend;
determine whether the third signal level is saturated;
on a condition that the third signal level is saturated, set the second gain of the second analog frontend stage to zero; and
set a third gain of a third analog frontend stage of the plurality of analog frontend stages to a third coarse gain value based on the third signal level; and
on a condition that the third signal level is not saturated, set the second gain of the second analog frontend stage of the plurality of analog frontend stages to a second fine gain value;
detect a fourth signal level at the output of the analog frontend;
determine whether the fourth signal level is saturated;
on a condition that the fourth signal level is saturated, set the third gain of the third analog frontend stage to zero; and
on a condition that the third signal level is not saturated, set the third gain of the third analog frontend stage of the plurality of analog frontend stages to a third fine gain value.

20. The system of claim 17, wherein the automatic gain controller is configured to:
detect the first signal level at the output of the analog frontend by:
obtaining a plurality of samples of a first signal at the output of the analog frontend; and
identifying a plurality of signal levels associated with the plurality of samples, respectively; and
determine that the first signal level is saturated by:
determining that at least one signal level of the plurality of signal levels exceeds a saturation threshold; and
in response to determining that the at least one signal level of the plurality of signal levels exceeds the saturation threshold, determining that the first signal level is saturated.

21. A receiver, comprising:
an analog frontend including a plurality of analog frontend stages having respective gains; and
an automatic gain controller configured to:
detect a first signal level at an output of the analog frontend;
determine that the first signal level is saturated;
set a first gain of a first analog frontend stage of the plurality of analog frontend stages to a first coarse gain value based on the first signal level in response to determining that the first signal level is saturated;

in response to setting the first gain, detect a second signal level at the output of the analog frontend;

determine whether the second signal level is saturated; and in response to determining that the second signal level is not saturated, set the first gain of the first analog frontend stage to a first fine gain value based on the second signal level, wherein the automatic gain controller is configured to set the first gain of the first analog frontend stage to the first coarse gain by:

determining a number of a plurality of signal levels that exceed a saturation threshold or a percentage of the plurality of signal levels that exceed the saturation threshold; and setting the first gain based on the number of the plurality of signal levels that exceed the saturation threshold or the percentage of the plurality of signal levels that exceed the saturation threshold, wherein the first coarse gain value is negatively correlated with the number of the plurality of signal levels that exceed the saturation threshold or the percentage of the plurality of signal levels that exceed the saturation threshold.

22. The receiver of claim 21, wherein the automatic gain controller is configured to:

on a condition that the second signal level is saturated,
set the first gain of the first analog frontend stage to zero; and
set a second gain of a second analog frontend stage of the plurality of analog frontend stages to a second coarse gain value based on the second signal level.

23. The receiver of claim 21, wherein the automatic gain controller is configured to:

detect the first signal level at the output of the analog frontend by:
obtaining a plurality of samples of a first signal at the output of the analog frontend; and
identifying a plurality of signal levels associated with the plurality of samples, respectively; and determine that the first signal level is saturated by:
determining that at least one signal level of the plurality of signal levels exceeds a saturation threshold; and
in response to determining that the at least one signal level of the plurality of signal levels exceeds the saturation threshold, determining that the first signal level is saturated.

* * * * *